US008194846B1

(12) United States Patent
Khan et al.

(10) Patent No.: US 8,194,846 B1
(45) Date of Patent: Jun. 5, 2012

(54) TRANSFER FUNCTION FOR MESSAGING PLATFORM IN PUBLIC TELEPHONE SYSTEM

(75) Inventors: Azhar I Khan, Norcross, GA (US); Navneet A Patel, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1103 days.

(21) Appl. No.: 11/960,672

(22) Filed: Dec. 19, 2007

Related U.S. Application Data

(63) Continuation of application No. 11/615,209, filed on Dec. 22, 2006, now Pat. No. 8,036,364, which is a continuation of application No. 10/294,368, filed on Nov. 14, 2002, now Pat. No. 7,149,300.

(51) Int. Cl.
*H04M 3/42* (2006.01)
*H04M 1/64* (2006.01)
(52) U.S. Cl. .............................. 379/212.01; 379/88.22
(58) Field of Classification Search .............. 379/212.01, 379/88.22
See application file for complete search history.

(56) References Cited

U.S. PATENT DOCUMENTS

| | | | | |
|---|---|---|---|---|
| 5,471,519 A | * | 11/1995 | Howe et al. | 379/88.26 |
| 5,479,496 A | * | 12/1995 | Endo et al. | 379/212.01 |
| 5,590,187 A | * | 12/1996 | Greenspan | 379/212.01 |
| 5,596,573 A | * | 1/1997 | Bertland | 370/474 |
| 5,742,905 A | * | 4/1998 | Pepe et al. | 455/461 |
| 5,896,441 A | * | 4/1999 | Akazawa et al. | 379/9 |
| 5,922,045 A | * | 7/1999 | Hanson | 709/206 |
| 6,021,190 A | * | 2/2000 | Fuller et al. | 379/212.01 |
| 6,061,432 A | * | 5/2000 | Wallace et al. | 379/88.18 |
| 6,185,288 B1 | * | 2/2001 | Wong | 379/219 |
| 6,226,289 B1 | * | 5/2001 | Williams et al. | 370/385 |
| 6,539,080 B1 | * | 3/2003 | Bruce et al. | 379/88.17 |
| 6,782,089 B1 | * | 8/2004 | Blackburn et al. | 379/212.01 |
| 6,801,763 B2 | * | 10/2004 | Elsey et al. | 455/404.1 |
| 6,853,718 B1 | * | 2/2005 | Bedingfield et al. | 379/212.01 |

* cited by examiner

*Primary Examiner* — Joseph T Phan

(57) ABSTRACT

A messaging system includes a messaging platform for storing a message from a calling party or transferring the calling party to a transfer station, a switching mechanism for receiving a call from the calling party to a subscriber, and a routing application at a server. The call from the calling party is connected to the messaging platform and the calling party signals to be transferred to the transfer station. In response, the messaging platform sends a transfer message to the routing application and the routing application directs the switching mechanism to disconnect the calling party from the messaging platform and connect the calling party to the transfer station.

12 Claims, 4 Drawing Sheets

TRANSFER FUNCTION FOR MESSAGING PLATFORM IN PUBLIC TELEPHONE SYSTEM

RELATED APPLICATIONS

This application is a continuation of U.S. application Ser. No. 11/615,209, filed Dec. 22, 2006, which is a continuation of U.S. application Ser. No. 10/294,368 (now U.S. Pat. No. 7,149,300) filed Nov. 14, 2002, which are both incorporated herein by reference.

FIELD OF THE INVENTION

The present invention relates to a telephone system with a messaging platform that stores a message from a caller for a subscriber, and a transfer function that allows the caller to opt to be transferred to a station designated by the subscriber. More particularly, the present invention relates to such a system where the transfer function is more efficiently implemented.

BACKGROUND OF THE INVENTION

In recent years, a number of new telephone service features have been provided by an Advanced Intelligent Network (AIN). The AIN evolved out of a need to increase the capabilities of the telephone network architecture in order to meet the growing needs of telephone customers or users. Additionally, as the number of people who rely on the Internet for communication increases, so too does the demand for the electronic transfer of data.

Referring now to FIG. 1, it is seen that an AIN-based network arrangement is provided within and/or in conjunction with a wire line telephone system LATA (Local Access and Transport Area) 101 that defines a calling service area. Note that a similar arrangement is also provided with and/or in conjunction with a wireless telephone system. Each LATA 101 (only one being shown in FIG. 1) includes stations (i.e. telephone lines and telephone equipment at the respective ends thereof) 103 and corresponding service switching points (SSPs) 105 (i.e., end offices or central offices). The SSPs 105 are each programmable switches which: recognize AIN-type calls; launch queries to service control points (SCPs) 107 (only one being shown in FIG. 1); and receive commands and data from SCPs 107 to further process and route AIN-type calls. A signal transfer point (STP) 109 may be employed to route signals between the SSPs 105, the SCPs 107, and other network elements. When one of the SSPs 105 is triggered by an AIN-type call, the triggered SSP 105 formulates an AIN service request and responds to call processing instructions from the network element in which the AIN service logic resides, typically at an SCP 107.

One type of event that may be arranged to set off an AIN trigger in an SSP 105 or the like is a call from a calling party to a called party where the called party subscribes to a messaging service and is unavailable to answer the call. Accordingly, the AIN trigger at issue is associated with the called party and with the SSP 105 of such called party. In response to the set-off trigger, the SSP 105 determines from the SCP 107 routing instructions for routing the call to the messaging platform. As may be appreciated, the messaging platform may play a greeting message to the calling party and then collect and store a voice message or the like therefrom. In addition, the messaging platform may collect and store call-related information including the time of the call and the telephone number of the calling party. Thus, the called party/ subscriber may at some later time call into the messaging platform and retrieve the stored voice message from the calling party, as well as the stored time of the call and the stored telephone number of the calling party.

In at least some instances, the subscriber may wish to provide the calling party the option of being transferred to a transfer station rather than leaving the voice message. As may be appreciated, the transfer station is selected by the subscriber and has a corresponding telephone number. Such transfer station may for example be located where the subscriber is presently available or may be located where an assistant of the subscriber is available to converse with the calling party, among other locales.

In the prior art, the messaging platform resided on a telephone line of the public telephone system and thus was called into by the calling party over the telephone line thereof. As a result, the messaging platform transferred the call from the calling party to the transfer station by way of another telephone line, and then bridged the call between the calling party and the messaging platform and the call between the messaging platform and the transfer station to form a transfer connection between the calling party and the transfer station.

However, and significantly, such an arrangement is inefficient in that the messaging platform is using two telephone lines and bridging resources to form the transfer connection, and in that the messaging platform is dedicating resources to the transfer connection even though the messaging platform likely need not be further involved in the call. Potentially, the two telephone lines of the messaging platform, the bridging resources, and the messaging platform could be tied up for hours on end without any significant involvement on the part of the messaging platform with the transfer connection between the calling party and the transfer station.

Accordingly, a need exists for a transfer function for a messaging platform in a public telephone system, where the transfer function more efficiently establishes a transfer connection between a calling party calling a subscriber and a transfer station designated by the subscriber. More particularly, a need exists for such a transfer function that establishes a direct transfer connection so that messaging platform resources employed during the transfer are minimal, and so that the messaging platform can be removed from the transfer connection if need be.

SUMMARY OF THE INVENTION

The present invention satisfies the aforementioned need by providing a system and method in connection with a messaging system implemented as a service to a subscriber by a telephone service provider of the subscriber. The messaging system stores a message from a calling party calling the subscriber or transfers the calling party to a transfer station designated by the subscriber. In the messaging system, a switching mechanism receives the call from the calling party to the subscriber, and is connected to a network. An application server is also connected to the network and runs a routing application. The switching mechanism notifies the routing application that the calling party is to be connected to a messaging platform. The messaging platform stores the message from the calling party or transfers the calling party to the transfer station, and is also connected to the network. The notified routing application directs the switching mechanism to establish communication between the calling party and the messaging platform by way of the network, and the switching mechanism establishes such communication. Accordingly, the calling party stores the message or signals for the transfer to the transfer station.

The messaging platform in response to the signal for transferring to the transfer station sends a transfer message to the routing application by way of the network. The transfer message includes a transfer telephone number corresponding to the transfer station, and the routing application receives the transfer message and directs the switching mechanism to disconnect the calling party from the messaging platform and connect the calling party to the transfer station by way of the transfer telephone number.

BRIEF DESCRIPTION OF THE DRAWINGS

The foregoing summary as well as the following detailed description of the present invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
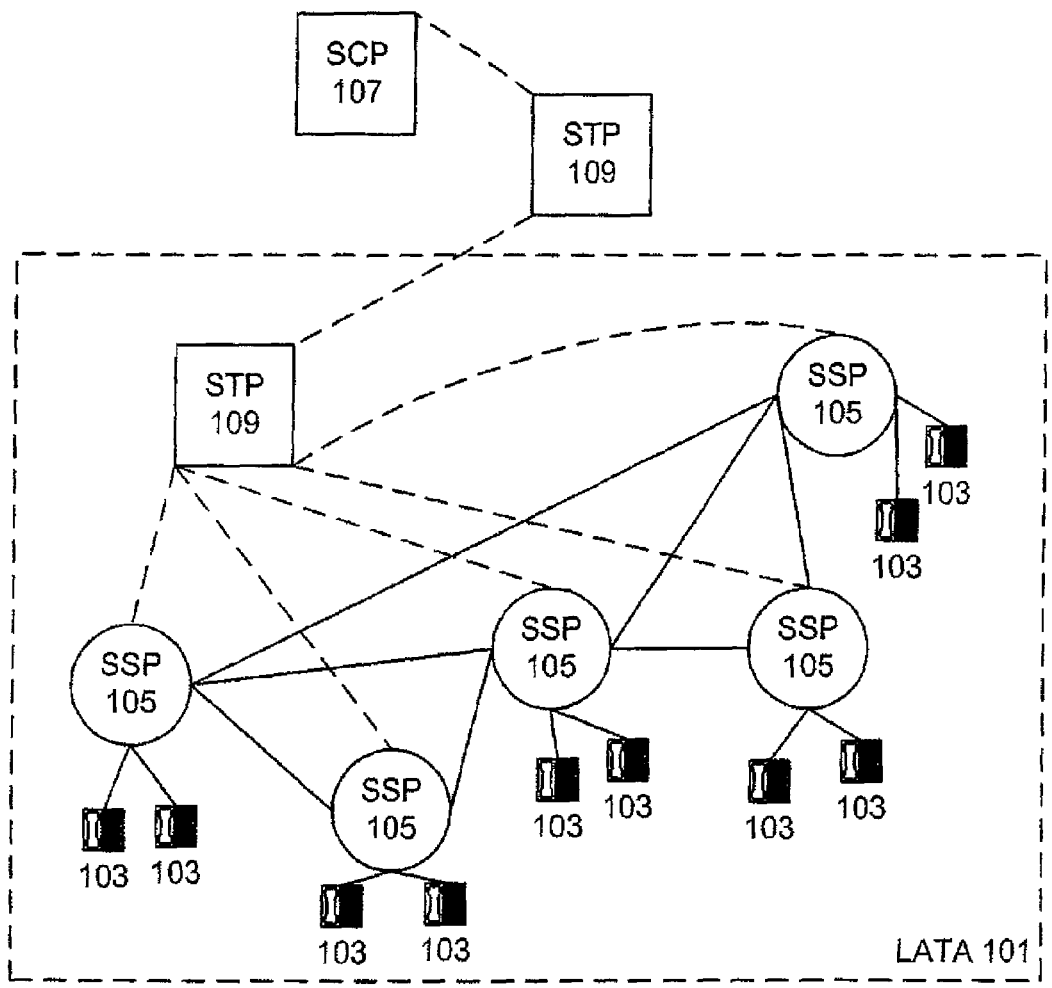
FIG. 1 is a block diagram showing a typical AIN-based telephone network such as may be employed in connection with the present invention.
Figure 2:
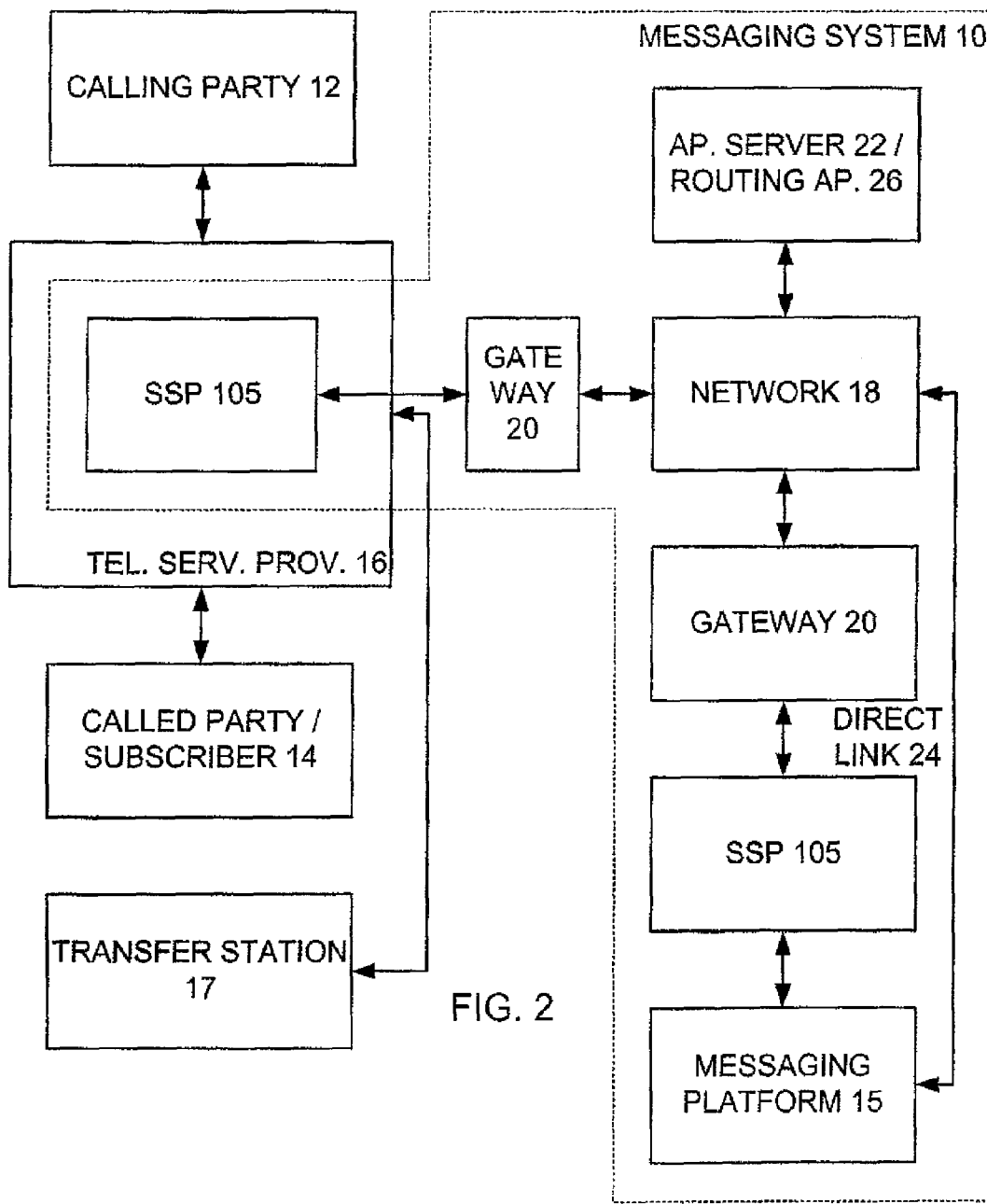
FIG. 2 is a block diagram showing a messaging system that allows a calling party calling a subscriber to opt to be transferred to a transfer station as designated by the subscriber in accordance with one embodiment of the present invention.

Referring to the drawings in detail, wherein like numerals are used to indicate like elements throughout, there is shown in FIG. 2 a messaging system 10 for providing a message service with a transfer function in accordance with one embodiment of the present invention. When actuated, a call from a calling party 12 to a called party/subscriber 14 is forwarded to a messaging platform 15. The messaging platform 15 presents the calling party 12 with an opportunity to leave a voice message or the like for the called party 14, and records and stores such voice message and perhaps also the telephone number of the calling party 12, the call time, etc. The called party 14 may then call into the messaging platform 15 and retrieve the voice message. Typically, the called party 12 determines when the system 10 is actuated therefor.

As should be appreciated, the messaging system 10 is implemented as a service to the called party/subscriber 14 by the telephone service provider 16 of the called party 14, and is at least partially implemented at an SSP 105 or central office administered by the telephone service provider 16 and an SCP 107. The messaging system 10 may be AIN-based or non-AIN based without departing from the spirit and scope of the present invention. As was set forth above, the messaging system 10 when actuated forwards a call from the calling party 12 to the called party/subscriber 14 to the messaging platform 15 based on a corresponding AIN trigger or the like being set off, followed by a service request from an SSP 105 to an SCP 107 which results in call processing instructions from the SCP 107 to the SSP 105 including how to connect the calling party 12 to the messaging platform 15. Thus, the called party/subscriber 14 may at some later time call into the messaging platform 15 and retrieve the stored voice message from the calling party 14, as well as the stored time of the call and the stored telephone number of the calling party 14.

In one embodiment of the present invention, in addition to or as an alternative to leaving the voice message, the subscriber 14 may allow the calling party 12 to opt to be transferred to a transfer station 17 at a corresponding telephone number thereof. As may be appreciated, the subscriber 14 in determining when the system 10 is actuated therefor may also determine when the calling party 12 can opt to be transferred to the transfer station 17, and can also designate the particular transfer station 17 by designating the corresponding telephone number. Actuating the system 10 and the transfer capability and designating the telephone number may be performed by way of any appropriate method and system. Such actuating and designating is known or should be apparent to the relevant public and therefore need not be discussed herein in any detail.

In the case where the subscriber 14 has actuated the transfer capability and provided a transfer telephone number, the calling party 12 upon being connected with the messaging platform 15 is provided by such messaging platform 15 with the option to be transferred to the transfer station 17 corresponding to the transfer telephone number. In particular, the messaging platform 15 may announce the option to the calling party 12 and the calling party may in fact signal or opt to be transferred by entering a particular key selection or voice command, for example. The messaging platform 15 may announce and the calling party 12 may enter by any appropriate mechanism without departing from the spirit and scope of the present invention. Such mechanisms are known or should be apparent to the relevant public and therefore need not be discussed herein in any detail.

In one embodiment of the present invention, and as seen in FIG. 2, the messaging platform 15 is at a telephone line connected to an SSP 105, but when the calling party 12 is connected to the messaging platform 15, the connection is made through a network 18 such as the Internet or the like. In particular, the SSP 105 of each of the calling party 12 and the messaging platform 15 includes a direct connection to a gateway 20 on the network 18. Note that the calling party 12 and the messaging platform 15 may share a common SSP 105, in which case the connection is still made through the network 18 by way of one or more gateways 20, for reasons that should be more clear from the below. If the network 18 is packet-based, as is the case with the Internet, the connection is also packet-based at least within the network 18.

In one embodiment of the invention, an application server 22 is also coupled to the network 18, and the messaging platform 15 is also coupled to the network through a direct link 24. Accordingly, the application server 22 can communicate directly with the messaging platform 15 over the network 18, again for reasons that should be more clear from the below.

In one embodiment of the present invention, the application server 22 runs a routing application 26 that efficiently establishes the call between the calling party 12 and the messaging platform 15 and that also efficiently establishes the transfer connection between the calling party 12 and the transfer station 17 upon the calling party 12 so requesting. Thus, the routing application 26 on the application server 22 in effect controls all communications between the calling party 12, the message platform 15, and the transfer station 17. The routing application 26 may also include a billing function that appropriately bills the subscriber 14 in connection with use of the messaging platform 15 and the transfer function.

In one embodiment of the present invention, the routing application 26, the SSP 105, and the messaging platform 15 all employ an enhanced hosting environment to enable packet-based communication by way of the network 18. For example, the environment may be the PACKETIN application hosting environment, available from LUCENT Technologies, Inc. of Murray Hill, N.J. As may be appreciated, such environment is a next-generation, converged-services platform that enables delivery of a wide variety of enhanced wire line and wireless services for converged voice and data networks, and that provides the infrastructure for new Internet Protocol (IP) and multimedia services.

The message platform 15, the gateways 20, the application server 22, the direct link 24, and the routing application 26 may respectively be any appropriate devices without departing from the spirit and scope of the present invention as long as such devices are capable of performing the functions and methods described herein. The operations of such devices are known or should be apparent to the relevant public and therefore need not be described herein in any detail except as set forth herein.

Figure 3A:
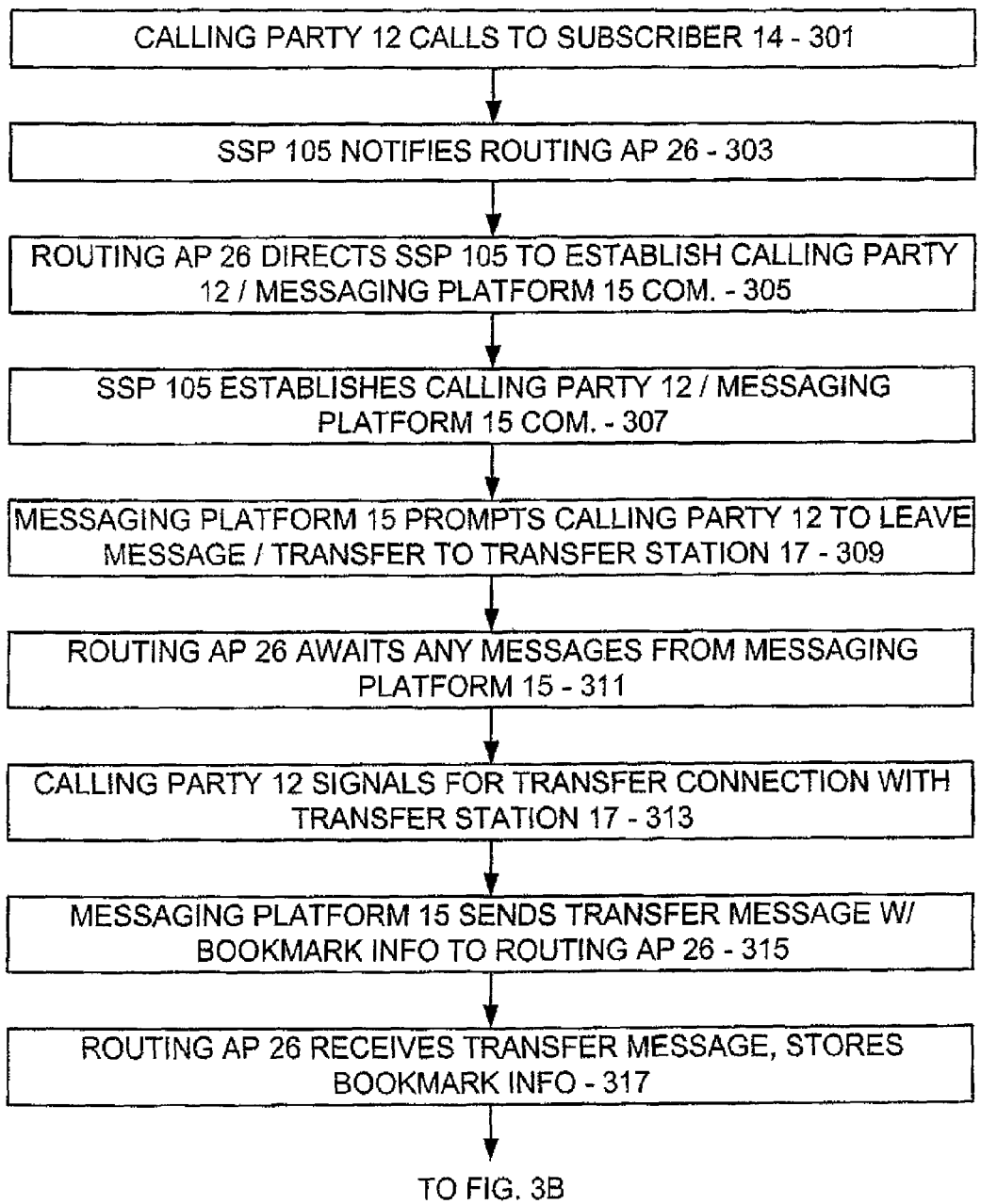
FIGS. 3A and 3B are flow diagrams showing steps performed in connection with the transfer of the calling party to the transfer station of FIG. 2.
Figure 3B:
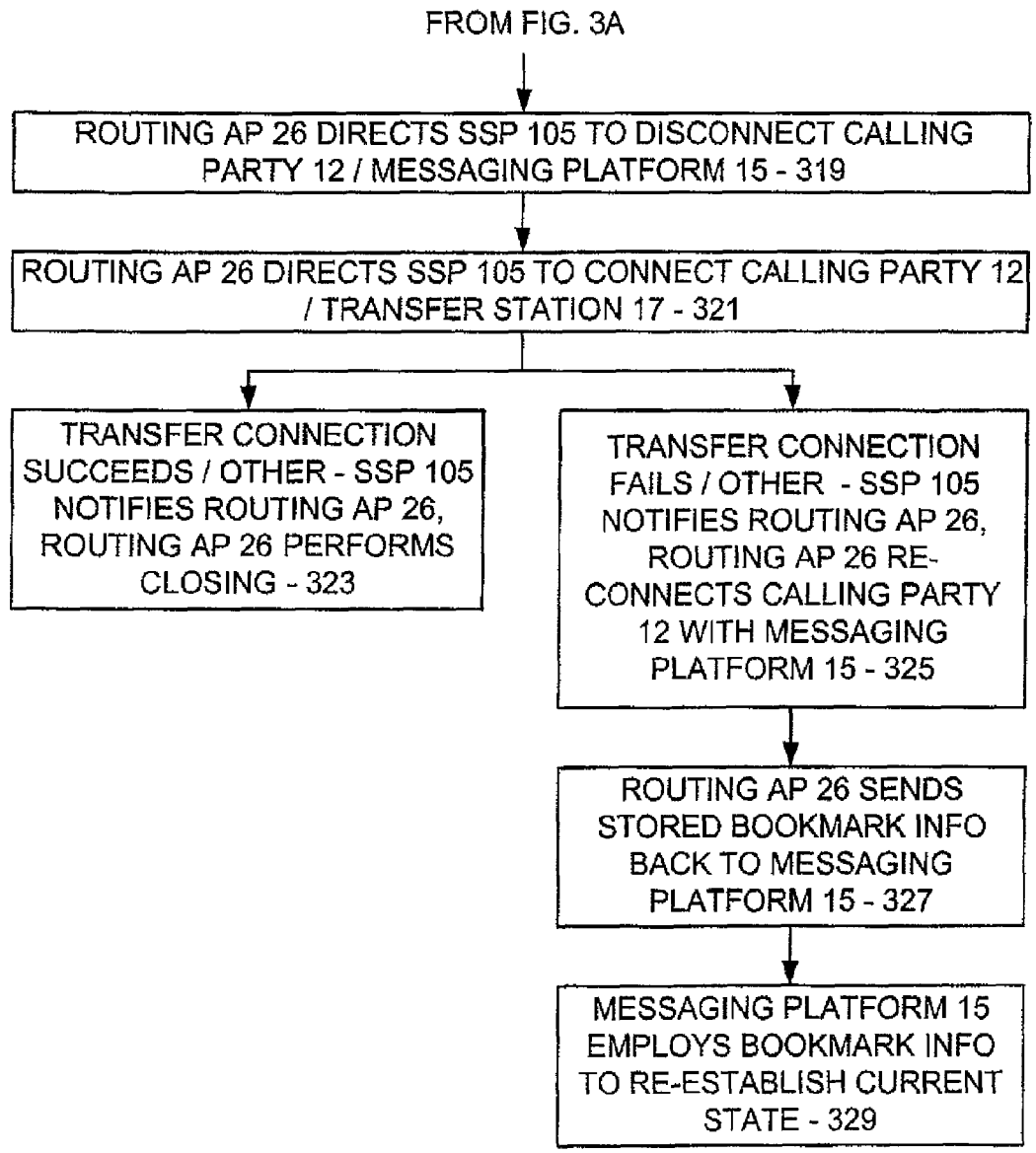

In one embodiment of the present invention, and turning now to FIGS. 3A and 3B, the messaging system 10 described herein operates in the following manner to efficiently establish a transfer connection to allow a calling party 14 connected to a messaging platform 15 to opt to be transferred to a transfer station 17 designated by the subscriber 14.

Bearing in mind that the subscriber has actuated the messaging platform 15 to collect and store voice messages therefor and has also actuated the messaging platform 15 to allow the calling party 12 to opt to be transferred to a designated transfer station 17, the process begins by the calling party 12 calling the subscriber 14 (step 301). In response thereto, the calling party is to be connected to the messaging platform 15. In particular, the SSP 105 of the subscriber 14 notifies the routing application 26 by way of the gateway 20 and the network 18 that the calling party 12 is to be connected to the messaging platform 15 (step 303), and the routing application 26 directs the setup of the messaging connection by appropriately instructing the SSP 105 how to establish communication between the calling party 12 and the messaging platform 15 by way of the gateways 20 and the network 18 (step 305). Accordingly, the SSP 105 in fact establishes such messaging connection according to the instructions from the routing application 26 (step 307), and the calling party 12 upon being connected with the messaging platform 15 is prompted to leave a message or to signal to be transferred to the transfer station 17 (step 309). In the meantime, the routing application 26 awaits any messages that may be generated therefor by the messaging platform 15 and sent thereto by way of the direct link 24 and the network 18 (step 311).

Presuming that the calling party 12 in fact signals to be transferred to the transfer station 17 (step 313), and in one embodiment of the present invention, the messaging platform 15 sends a transfer message to the routing application 26 by way of the direct link 24 and the network 18 (step 315). Note that the messaging platform 15 may or may not have any further involvement with the calling party 12 in connection with the present transaction. If the calling party 12 is to be transferred to the transfer station 17 without anything more, then the transfer message from the messaging platform 15 need only include the corresponding transfer telephone number, plus any other necessary information. However, if the calling party 12 is to be transferred to the transfer station 17 with the option of being returned to the messaging platform 15 if the transfer station 17 fails to answer, for example, then the transfer message from the messaging platform 15 should include the corresponding transfer telephone number and also 'bookmark' information relating to the current state of the messaging platform 15 with regard to the calling party 12. Such bookmark information may include an identifier of the subscriber 14 and/or a mailbox thereof at the messaging platform 15, an identifier of the calling party 12, the telephone number of the calling party 12, and the like.

The routing application 26 receives the transfer message and stores any bookmark information contained therein, and based on the transfer message determines that a transfer connection between the calling party 12 and the transfer station 17 is desired (step 317). Accordingly, the routing application 26 directs the SSP 105 to disconnect the calling party 12 from the messaging platform 15 (step 319), thus freeing the messaging platform 15, and to connect the calling party 12 to the transfer station 17 at the corresponding transfer telephone number (step 321). Significantly, and in contrast with the prior art, only a single connection is required between the calling party 12 and the transfer station 17 in the present invention, and no bridging is necessary. In addition, the messaging platform 15 is entirely removed from the connection. Accordingly, the present invention establishes the connection more efficiently as compared with the prior art.

Notably, the SSP 105 remembers that the calling party 12 is involved in a transfer connection and that the calling party 12 may need to be re-connected to the messaging platform 15 if, for example, the transfer connection fails. If in fact the transfer connection succeeds, the SSP 105 notifies the routing application 26 of same and the routing application 26 performs any closing functions necessary (step 323), perhaps including notifying the messaging platform 15 and performing any billing functions.

Otherwise, if the transfer connection fails or if for any other reason the calling party 12 is to be re-connected with the messaging platform 15, the SSP 105 notifies the routing application 26 of same and the routing application 26 re-connects the calling party 12 with the messaging platform 15 (step 325). In addition, the routing application 26 sends the previously stored bookmark information back to the messaging platform 15 (step 327) and the messaging platform 15 employs such bookmark information to re-establish the current state at the point where the calling party 12 signaled for the transfer connection (step 329). The routing application 26 may also perform any intermediate functions necessary, perhaps including performing any billing functions.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful messaging system 10 that includes a transfer function for a messaging platform 15 in a public telephone system, where the transfer function more efficiently establishes a transfer connection between a calling party 12 calling a subscriber 14 and a transfer station 17 designated by the subscriber 14. The transfer function establishes a direct transfer connection so that messaging platform resources employed during the transfer are minimal, and so that the messaging platform 15 can be removed from the transfer connection. Thus, the transfer connection is efficiently established. It should be appreciated that changes could be made to the embodiments described above without departing from the inventive concepts thereof. Notably, the present invention is equally applicable to wire line and wireless telephone systems, and to routing within or between such wire line and wireless systems. It should be understood, therefore, that this invention is not limited to the particular embodiments disclosed, but it is intended to cover modifications within the spirit and scope of the present invention as defined by the appended claims.

The invention claimed is:

1. A messaging system implemented as a service to a subscriber by a telephone service provider of the subscriber, the messaging system for enabling a calling party calling the subscriber to opt to be transferred to a transfer station designated by the subscriber and to leave a voice message for the subscriber, the messaging system comprising:
   a calling party switching mechanism for receiving a call from the calling party to the subscriber, the calling party switching mechanism being connected to a network;
   an application server connected to the network and running a routing application, the calling party switching mechanism for notifying the routing application that the calling party is to be connected to a messaging platform;
   the messaging platform for one of storing the voice message from the calling party and transferring the calling party to the transfer station, the messaging platform being connected to the network, the routing application for directing the switching mechanism to establish communication between the calling party and the messaging platform by way of the network, the calling party switching mechanism for establishing such communication, whereby the calling party one of stores the voice message and signals for transferring the calling party to the transfer station, the messaging platform in response to the signal for transferring the calling party to the transfer station sending a transfer message to the routing application by way of the network, the transfer message including a transfer telephone number corresponding to the transfer station, the routing application for receiving the transfer message and directing the calling party switching mechanism to disconnect the calling party from the messaging platform and connect the calling party to the transfer station by way of the transfer telephone number, and the messaging platform for enabling the subscriber to determine when the calling party may opt to be transferred to the transfer station and configured to announce to the calling party that the calling party may opt to be transferred to the transfer station in response to the subscriber indicating that the calling party may opt to be transferred.

2. The system of claim 1 wherein the transfer message also includes bookmark information relating to a current state of the messaging platform with regard to the calling party, the routing application for receiving and storing the bookmark information, the calling party switching mechanism for determining that the calling party is to be re-connected to the messaging platform and thereafter notifying the routing application of same, the routing application for directing that the calling party be re-connected with the messaging platform and sending the bookmark information back to the messaging platform and the messaging platform employing such bookmark information to re-establish the current state.

3. The system of claim 1 at least partially implemented at one of a service switching point and a central office administered by the telephone service provider.

4. The system of claim 1 wherein the messaging platform is connected to the network by way of a messaging platform switching mechanism, whereby a call from the calling party to access a stored message is connected to the messaging platform through a subscriber switching mechanism, the network, and the messaging platform switching mechanism.

5. The system of claim 4 wherein the calling party switching mechanism is the messaging platform switching mechanism.

6. The system of claim 4 further comprising a direct link between the messaging platform and the network, whereby the routing application can communicate with the messaging platform by way of the direct link.

7. The system of claim 1 wherein the routing application, the calling party switching mechanism, and the messaging platform all employ an enhanced hosting environment to enable packet-based communication by way of the network.

8. A method in connection with a messaging system implemented as a service to a subscriber by a telephone service provider of the subscriber, the messaging system for enabling a calling party calling the subscriber to opt to be transferred to a transfer station designated by the subscriber and to leave a voice message for the subscriber, the messaging system including a switching mechanism for receiving a call from the calling party to the subscriber, a messaging platform for storing the voice message from the calling party and for transferring the calling party to the transfer station, and an application server running a routing application for routing communications between the calling party, the messaging platform, and the transfer station, the switching mechanism, the messaging platform, and the application server all being connected to a network, the method comprising:
   the switching mechanism receiving the call from the calling party to the subscriber;
   the switching mechanism notifying the routing application that the calling party is to be connected to the messaging platform;
   the routing application directing the switching mechanism to establish communication between the calling party and the messaging platform by way of the network;
   the switching mechanism establishing such communication, whereby the calling party one of stores the voice message and signals for transferring the calling party to the transfer station;
   the messaging platform announcing to the calling party that the calling party may opt to be transferred to the transfer station in response to the subscriber indicating that the calling party may opt to be transferred;
   the messaging platform in response to the signal for transferring the calling party to the transfer station sending a transfer message to the routing application by way of the network, the transfer message including a transfer telephone number corresponding to the transfer station, wherein the messaging platform is for enabling the subscriber to determine when the calling party may opt to be transferred to the transfer station;
   the routing application receiving the transfer message and directing the switching mechanism to disconnect the calling party from the messaging platform and connect the calling party to the transfer station by way of the telephone number.

9. The method of claim 8 wherein the transfer message also includes bookmark information relating to a current state of the messaging platform with regard to the calling party, the method further comprising:
   the routing application receiving and storing the bookmark information;
   the switching mechanism determining that the calling party is to be re-connected to the messaging platform and thereafter notifying the routing application of same;
   the routing application directing that the calling party be re-connected with the messaging platform and sending the stored bookmark information back to the messaging platform, and the messaging platform employing such bookmark information to re-establish the current state.

10. The method of claim 9 wherein the bookmark information includes an identifier of the calling party at the messaging platform.

11. The method of claim 8 wherein the messaging platform is connected to the network by way of the switching mechanism and by way of a direct link, the method comprising the routing application communicating with the messaging platform by way of the direct link.

12. The method of claim 8 comprising the routing application, the switching mechanism, and the messaging platform all employing an enhanced hosting environment to enable packed-based communication by way of the network.

* * * * *